E. SACHS.
DEVICE FOR FASTENING COASTER BRAKES.
APPLICATION FILED JULY 10, 1912.
1,063,069.
Patented May 27, 1913.
2 SHEETS—SHEET 1.
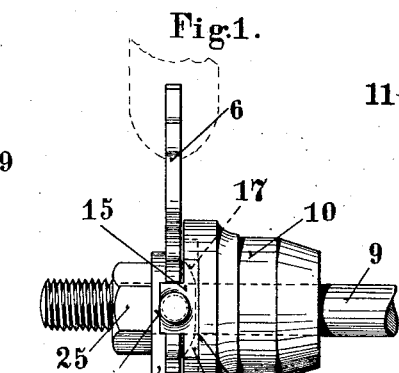
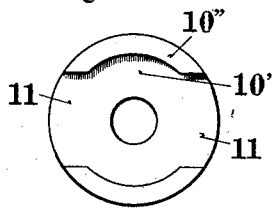
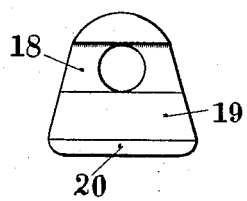
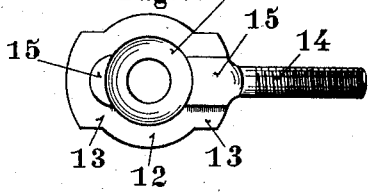
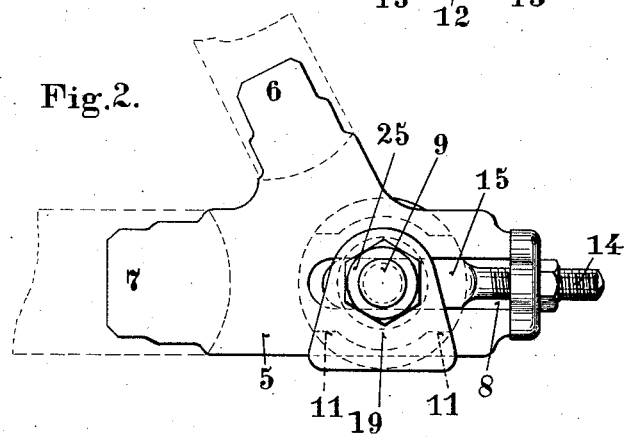
Witnesses
W. Wallace Nairn Jr.
Rosina J. Finotti
Inventor
Ernst Sachs
By Julius C. Dowell
his attorney.

E. SACHS.
DEVICE FOR FASTENING COASTER BRAKES.
APPLICATION FILED JULY 10, 1912.
1,063,069.
Patented May 27, 1913.
2 SHEETS—SHEET 2.
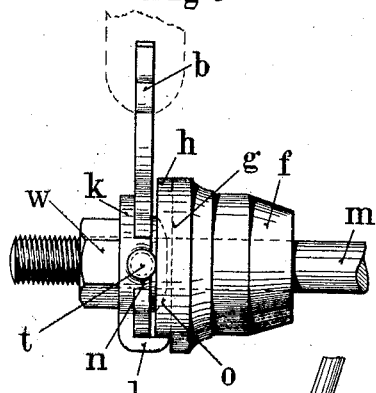
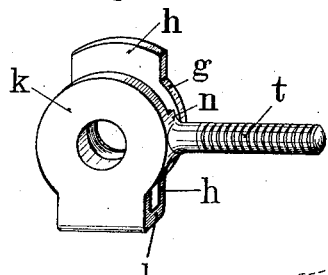
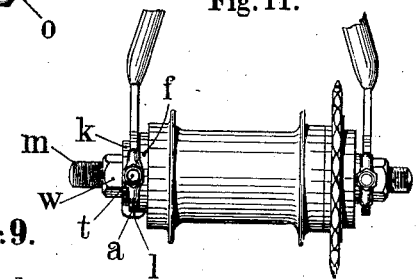
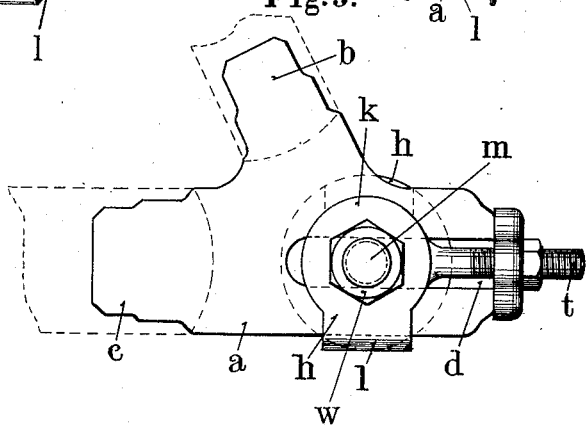
Witnesses
Inventor

UNITED STATES PATENT OFFICE.

ERNST SACHS, OF SCHWEINFURT, GERMANY.

DEVICE FOR FASTENING COASTER-BRAKES.

1,063,069.  Specification of Letters Patent.  Patented May 27, 1913.

Application filed July 10, 1912. Serial No. 708,643.

*To all whom it may concern:*

Be it known that I, ERNST SACHS, a subject of the King of Bavaria, residing at No. 23 Schultesstrasse, Schweinfurt, in Germany, have invented new and useful Improvements in Devices for Fastening Coaster-Brakes, of which the following is a specification.

This invention has reference to devices for rigidly connecting a stationary or non-rotative brake part of a coaster brake for cycles to the cycle frame, especially to the rear fork eye or end of such frame, wherein the rear-wheel axle is located and adjustably fixed by the usual means.

The object of the invention is to devise a separate appliance which is easy to be engaged with the said brake part and which not only produces a secure connection by the engagement of both sides of the forked eye, but prevents the fork limbs of the eye from being bent inward or outward. These objects are attained by forming the intermediate or connecting part disposed between the brake body and the fork-eye, of two flat members and providing thereon two axial extensions one of which is adapted to engage the longitudinal slot of the fork, while the other at the same time bears against the lower outer edge of said eye, whereby large supporting faces of the several parts are contacting each other; thus pressure is distributed on several points of the fork-eye on which points the pressure also works in the same direction with respect to the upper and lower limbs, so that there is no liability of the limbs to be spread apart or to be bent up. To attain this combined operation, it is further essential that the two members be rigidly or non-rotatably connected the one with the other, and in fact a further feature resides in the special mode of connecting the two members by one of said axial extensions being engaged with the fork eye, by which means the two members are rigidly united and prevented from relative rotation, while the adjustment longitudinally of the slot of the eye is not interfered with. Furthermore, it will be seen that since the axial extension which connects the two members together is provided on the member which is directly attached to the brake-part there is a direct transmission of the force not only by the fork-eye but also by the other member of the fixing device. In this construction an adjusting washer which may be renewed when worn is provided convex on one of its sides and located in a depression of one member may be used, while the chain-tightening screw-bolt is preferably formed upon the connecting device.

In the accompanying drawings which form a part of this specification two constructional forms of the fixing device according to the invention are represented.

Figure 1 is the rear view of the first construction, as fixed to a fork-eye; Fig. 2 is a side elevation thereof, also illustrating the chain-tightening means; Fig. 3 shows the outer side view of the one member; Fig. 4 is a vertical section through the center thereof; Fig. 5 is a cross-section of the adjusting washer; Fig. 6 is an elevation of the inner face of the outer member of the fixing device; Fig. 7 is a side view of the outer end face of the brake part; Fig. 8 is the rear view of a second construction of the fixing device attached to a fork-eye, and Fig. 9 a side elevation thereof; Fig. 10 is a perspective side elevation of the fixing device alone; Fig. 11 illustrates on a smaller scale a side elevation of a rear-wheel hub and the means for attaching it to the cycle together with the fixing device.

Like reference characters denote like parts throughout all respective figures of the drawing.

Referring to the construction illustrated in Figs. 1 to 7, the rear fork eye 5, which is of the usual flat shape and with its arms 6 and 7 brazed, as indicated by dotted lines, into the tubes of the cycle frame, contains in its longitudinal slot 8 the rear wheel axle 9, upon which is screwed the brake member to be attached. This brake member is a cone 10 adapted to expand a brake sleeve (as described in the patent granted to me No. 777,811, dated December 20, 1904). This construction of the hub brake is however merely referred to for purpose of example, but the fixing device which is alone essential may be used in connection with any other coaster brake.

In the outer end of the brake member 10 a recess 10' is sunk, and the axially projecting edge or flange portion 10'' is cut away at the places 11 (Fig. 7). In the recess 10' is located a flat member 12 of corresponding external form (Fig. 3), the radial projections 13 of which fit into the gaps 11. Upon that side of the connecting member 12 which is remote from the brake member 10 an axial extension 15 is formed longitudinally extending upon the body 12 and the projections 13. The extension or projection 15 is of the same lateral width as the slot 8 into which it is engaged. In the central portion of the member 12 and of the extension 15 a recess 16 is hollowed out for the reception of the curved side of an adjustable washer 17 of the usual form, the flat side of which bears against the inside of the rear fork eye. A second washer with curved face may however be interposed at some other point, say between the disk 19 and the nut 25 for example as is well known. The extension 15 on the connection member 12 is made to protrude a slight distance beyond the outer side of the fork end, and engages in a correspondingly shaped recess 18 in the other flat locking member 19 (Fig. 1), which is forced, by means of a nut 25 screwed on to the axle 9, against the outer side of the fork eye 5, and at the same time embraces the lower edge of the fork eye with a bent portion or flange 20 provided on its lower edge. To the outer end of the axial extension 15 is rigidly attached a screw bolt 14 (Fig. 3) which is a part of the usual chain-tightening appliance fully illustrated in Fig. 2. This bolt is therefore fixed in its proper position relative to the fork eye 5.

In the construction represented in Figs. 8 to 10 the two flat members of the fixing device situated on both sides of the eye of the fork are united by one axial projection so as to form a single piece.

The fork eye $a$ is fixed to the cycle frame by its arms $b$ and $c$ as hereinbefore described in connection with the other construction. The means for attaching the brake member $f$ to the fork eye $a$, in the slot $d$ of which the hub-axle $m$ is adjustable, consists of a U-shaped member one limb $g$ of which lies on the inside of the fork eye $a$ and is inserted in the recess in the outer end of the brake member $f$, with which it is non-rotatably connected by the radial portions $h$ which fit into corresponding gaps in the edge portion of the brake member $f$. This engagement is similar to that described above in connection with Figs. 3 and 7. The outer limb $k$ of the U-shaped member, which limb is likewise conveniently of disk shape, acts simultaneously as a washer for the nut $w$ which is screwed on to the axle, while the axial extension or yoke portion $l$ connects the two limbs and embraces the lower edge of the fork eye. Both limbs are pierced to take the axle $m$. From the inner face of the limb $k$ an axial extension or projection $n$ extends into the slot $d$ in the fork eye and, together with the locking engagement by the bent portion $l$, prevents the rotation of the attaching member $g$, $k$ on the eye of the fork. The inner side of the limb $g$ is hollowed out around the axle and the depression thus formed receives the curved side of the dished washer $o$ the flat side of which bears against the inner side of the fork eye $a$. From the rear end of the axial projection $n$ protrudes a screw bolt $t$ which is rigidly connected thereto or made in one piece therewith and forms a part of the chain tightening device.

The fixing device according to this invention insures considerable advantages in respect of rapid and secure connection of the brake-part to the fork eye. In this arrangement of the connecting parts the fork eye is embraced both on the inside by the projection entering the slot and on the outside edge by the bent or flange portion. The chain tightening device being rigidly united with the connecting device is always located in the proper position in relation to the fork end, so that the application thereof to a bicycle is facilitated and can be effected by simply pushing it on to the fork eye from the rear. To release the connection it is only necessary to slacken the nut, because all the parts remain combined on the axle withdrawn from the slot. Moreover, as all these parts are positively combined, the loss of separate small parts cannot take place. No alteration in the usual formation of the fork eye is required for the application of the device.

This invention may be embodied by different constructions, as illustrated in two examples.

What I, therefore, broadly claim as my invention, and desire to secure by Letters Patent, is:

1. In a device for non-rotatably fastening a stationary part of a coaster-brake for cycles, the combination with a slotted eye provided on the rear fork of the cycle, of an axle adjustable in the slot of said eye, a brake part fixed upon the axle, and a fastening device composed of two special members, one of which is located inside the eye and non-rotatably engaged with the brake part and the other outside the eye, and two axial extensions one engaged in the slot and one embracing the lower edge of the eye, one of the extensions also uniting the two members non-rotatably.

2. The combination with a slotted eye provided on the cycle frame and adapted to receive the axle of a wheel-hub, of a coaster brake element to be non-rotatably attached to said eye and a fastening device adapted to interconnect the eye and the brake, and composed of two flat members embracing the eye on its two sides and being in positive engagement with the said brake part and with the eye by radial and axial projections formed on said members, one of the axial projections connecting the two members non-rotatably.

3. The combination with a slotted eye of a cycle frame, of a coaster-brake capable of being attached to said eye, and a device for non-rotatably fastening the coaster-brake to the eye, said fastening device being composed of two members facing the two sides of the eye and having radial projections engaged with the coaster-brake, and axial extensions one projecting into the slot of the eye and another embracing the outer edge of the eye, one of them positively connecting the two members against rotation.

4. A device for non-rotatably fastening a coaster-brake to the slotted eye of the cycle frame, composed of opposed members facing the sides of said eye, one of said members having radial projections engaged in radial gaps of a brake-part, and axial extensions engaged with the slot, the other of said members having an axial extension engaging the outer edge of said eye, together with means for connecting said members so as to hold them against rotation.

5. A device for non-rotatably fastening a coaster-brake to the slotted eye provided on the rear fork of a cycle frame, composed of two members facing the sides of said eye and having radial projections engaged in radial gaps of a brake part and a plurality of axial extensions engaged with the slot and with the outer edge of the said eye and also interconnecting the two members so as to prevent them against relative rotation.

6. A device for non-rotatably fastening a wheel-hub with coaster-brake to the slotted eye provided on the rear fork of a cycle frame, composed of two members facing the sides of said eye and having radial projections adapted to engage a brake part and an axial extension embracing the outer edge of the eye and another axial extension engaged in the slot of the eye, and a chain-tightening appliance united with the latter extension.

7. A device for non-rotatably fastening a wheel-hub with coaster-brake to the slotted eye provided on the rear fork of a cycle frame, composed of two members one on each side of said eye and having radial and axial projections adapted to engage said brake-part and said eye, and a washer convex on one side, interposed between the eye and one of said members and located in a depression of said member.

8. In a device for non-rotatably fastening a coaster brake, the combination with an eye provided on the rear fork of a cycle and having a longitudinal slot, of an axle received in the slot of the eye, means for fixing the axle therein, a coaster-brake part provided on said axle and having a depression and radial gaps extending therefrom, a fastening member facing the inner side of said eye and having radial projections which member is capable of being engaged in the depression and gaps of the brake part, another fastening member facing the outer side of the eye, the said members surrounding the axle, axial extensions projecting from said members into the slot and embracing the outer edge of the eye, one of said extensions being so arranged as to positively connect the said members against relative rotation.

9. The combination with a slotted eye of a cycle frame, of a coaster-brake capable of being attached to said eye, and a device for non-rotatably fastening the coaster-brake to the eye, said fastening device being composed of two members facing the two sides of the eye and having radial projections engaged with the coaster-brake, and axial extensions projecting into the slot of the eye and embracing the outer edge of the eye, one of them being provided upon a radial projection and positively connecting the two members against rotation.

In testimony whereof I have signed my name to this specification in the presence of two subscribing witnesses.

ERNST SACHS.

Witnesses:
WOLDEMAR HAUPT,
HENRY HASPER.

Copies of this patent may be obtained for five cents each, by addressing the "Commissioner of Patents, Washington, D. C."